United States Patent
Otomo et al.

(10) Patent No.: US 7,131,602 B2
(45) Date of Patent: Nov. 7, 2006

(54) AEROSOL PRODUCT

(75) Inventors: Takashi Otomo, Koga (JP); Masatsugu Matsuura, Koga (JP)

(73) Assignee: Daizo Corporation, Osaka (JP)

( * ) Notice: Subject to any disclaimer, the term of this patent is extended or adjusted under 35 U.S.C. 154(b) by 142 days.

(21) Appl. No.: 10/474,803

(22) PCT Filed: Apr. 12, 2002

(86) PCT No.: PCT/JP02/03640

§ 371 (c)(1),
(2), (4) Date: May 12, 2004

(87) PCT Pub. No.: WO02/083321

PCT Pub. Date: Oct. 24, 2002

(65) Prior Publication Data

US 2004/0217200 A1    Nov. 4, 2004

(30) Foreign Application Priority Data

Apr. 13, 2001  (JP) .............................. 2001-115305

(51) Int. Cl.
*B05B 7/32* (2006.01)
*B67D 5/58* (2006.01)
*B65D 83/00* (2006.01)

(52) U.S. Cl. ..................... 239/337; 239/373; 222/190; 222/402.1

(58) Field of Classification Search ................ 222/190, 222/402.1, 402.11, 402.13–25; 446/15–21, 446/176–179; 239/337, 333, 340, 373
See application file for complete search history.

(56) References Cited

U.S. PATENT DOCUMENTS

| | | | | |
|---|---|---|---|---|
| 3,970,219 | A | * | 7/1976 | Spitzer et al. ................. 222/1 |
| 4,301,119 | A | * | 11/1981 | Cobbs et al. ............... 422/133 |
| 5,160,665 | A | | 11/1992 | Owada et al. |
| 5,223,244 | A | * | 6/1993 | Moro et al. ................... 424/46 |
| 5,462,469 | A | * | 10/1995 | Lei .............................. 446/15 |
| 5,635,469 | A | * | 6/1997 | Fowler et al. ............. 510/406 |
| 6,004,920 | A | * | 12/1999 | Pollack et al. ............. 510/426 |
| 6,021,926 | A | * | 2/2000 | Lauwers et al. ......... 222/402.1 |
| 6,622,943 | B1 | * | 9/2003 | Poisson et al. ............. 239/337 |
| 6,647,927 | B1 | * | 11/2003 | Werde et al. ............... 119/711 |
| 6,824,079 | B1 | * | 11/2004 | Kendrick et al. ........... 239/343 |

FOREIGN PATENT DOCUMENTS

| JP | 2-255889 | | 10/1990 |
|---|---|---|---|
| JP | 8-199190 | | 8/1996 |
| JP | 81999190 | * | 8/1996 |
| JP | 9-25223 | | 1/1997 |
| JP | 11-308958 A | | 11/1999 |
| JP | 2000-7523 A | | 1/2000 |
| JP | 2000-119132 A | | 4/2000 |
| JP | 2000-178101 A | | 6/2000 |

* cited by examiner

*Primary Examiner*—David A. Scherbel
*Assistant Examiner*—Seth Barney
(74) *Attorney, Agent, or Firm*—Antonelli, Terry, Stout and Kraus, LLP.

(57) ABSTRACT

The present invention provides an aerosol product, which sprays a large number of independent bubbles in the form of soap bubbles. More specifically, the aerosol product, which sprays a large number of independent bubbles in the form of soap bubbles, is provided by charging an aerosol container with an aerosol composition obtained by emulsifying an aqueous concentrate and a liquefied gas.

7 Claims, 3 Drawing Sheets

AEROSOL PRODUCT

RELATED APPLICATIONS

This application is a U.S. national stage application filed under 35 U.S.C. §371 of International Application No. PCT/JP02/03640 filed Apr. 12, 2002, which in turn claims priority of Japanese Patent Application No. 2001-115305 filed Apr. 13, 2001.

TECHNICAL FIELD

The present invention relates to an aerosol product, which sprays a large number of independent bubbles in the form of soap bubbles. More specifically, the present invention relates to an aerosol product which can spray bubbles, in which each bubble independently forms a single membrane, as soap bubbles do, and the entire bubble contacts with air, or a large number of small bubbles, in which a few independent bubbles are attached to each other and each of the attached bubbles contact with air, instead of usual foam in which a large number of bubbles are gathered and only the bubbles on the surface contacts with air.

BACKGROUND ART

Many conventional foaming aerosol products have a spraying mode, in which foam is discharged in a foamed state, mist is sprayed and foamed on the applied surface, or gel is discharged and foamed by applying shearing. However, in each case, small bubbles are successive and foam having a size of a ping-pong ball as a whole is used.

An aerosol product obtained by emulsifying an aqueous concentrate and a liquefied gas, in which bubbles break while crackling when discharged (JP-A-2-255889) is known. However, in the above product, small bubbles are successive when foaming.

In this way, in conventional foaming aerosol products, small bubbles are successive and an aerosol product, which sprays independent bubbles such as soap bubbles, did not exist.

The present invention aims to provide an aerosol product, which sprays a large number of independent bubbles in the form of soap bubbles. Particularly, the present invention aims to provide an aerosol product having favorable adhesion to the object (such as hair or skin), in comparison to the usual spray product, and can spray a large number of bubbles in the form of soap bubbles, which are easily broken in comparison to the conventional.

DISCLOSURE OF INVENTION

The present inventors have found that an aerosol product, in which a specific aerosol container is charged with an aerosol composition obtained by emulsifying an aqueous concentrate and a liquefied gas, can spray a large number of independent bubbles in the form of soap bubbles and the present invention was accomplished.

That is, the present invention relates to (1) an aerosol product comprising an aerosol container charged with an aerosol composition obtained by emulsifying an aqueous concentrate and a liquefied gas, wherein the aerosol product sprays a large number of independent bubbles in the form of soap bubbles.
(2) the aerosol product of the above (1), wherein the aqueous concentrate contains 0.1 to 30% by weight of a surfactant,
(3) the aerosol product of the above (1) or (2), wherein the aqueous concentrate contains 3.0 to 60% by weight of a lower alcohol,
(4) the aerosol product of the above (1), (2) or (3), wherein the liquefied gas comprises a liquefied petroleum gas as a main component,
(5) the aerosol product of the above (1), (2), (3) or (4), wherein the ratio of the aqueous concentrate and the liquefied gas (aqueous concentrate/liquefied gas (weight ratio)) is 5/95 to 50/50,
(6) the aerosol product of the above (1), (2), (3), (4) or (5), wherein the aerosol container has an aerosol valve without a vapor tap, and
(7) the aerosol product of the above (1), (2), (3), (4), (5) or (6), wherein a spraying button which is fixed to the aerosol container is a straight spraying orifice and has no mechanical break up mechanism.

BEST MODE FOR CARRYING OUT THE INVENTION

Figure 1:
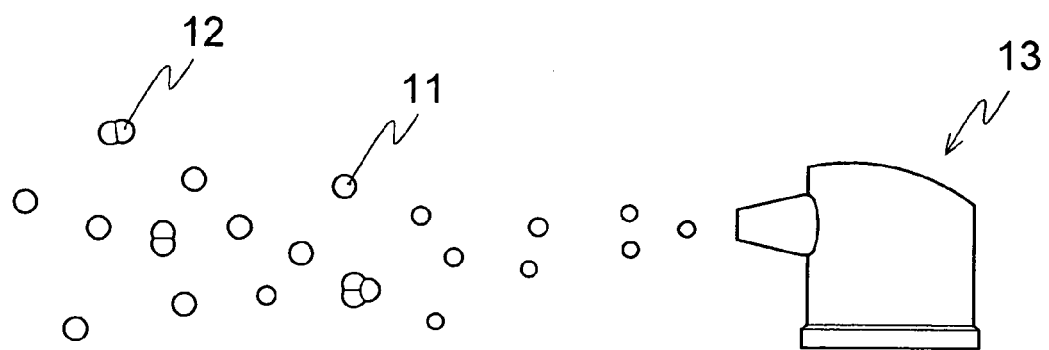
FIG. 1 is a schematic view depicting independent bubbles in the form of soap bubbles, which are sprayed from the aerosol product of the present invention.
Figure 2:
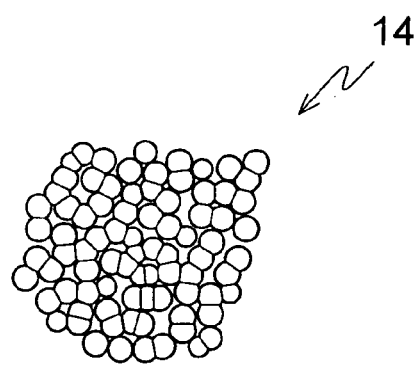
FIG. 2 is a schematic view depicting the usual foam.

An aerosol product of the present invention is obtained by charging an aerosol container with an aerosol composition, obtained by emulsifying an aqueous concentrate and a liquefied gas, and sprays a large number of independent bubbles in the form of soap bubbles as shown in FIG. 1. In FIG. 1, 11 depicts independent bubbles, 12 depicts bubbles in which independent bubbles are attached and 13 depicts a nozzle. Independent bubbles in the form of soap bubbles refer to bubbles in which each bubble independently forms a single membrane and the entire bubble contacts with air (the bubble is one spherical body) or in which a few independent bubbles are attached to each other and each of the attached bubbles contact with air, instead of the usual foam indicated by 14 of FIG. 2, in which a large number of bubbles of approximately 0.5 to 1 mm are successively gathered and only the bubbles on the surface contact with air. Independent bubbles in the form of soap bubbles easily adhere to the object (such as scalp and skin) and easily break due to contact with air and as a result, have the characteristic of rapidly diffusing the active ingredient to the object. The size (diameter) of each independent bubble in the form of a soap bubble is preferably 0.1 to 10 mm, more preferably 0.2 to 5 mm. When the size of the bubbles is too small, visual determination of the bubble tends to be difficult and adhesion tends to decrease. When size of the bubbles is too large, the bubble tends to be easily broken and the time for which the bubble state is maintained tends to be shortened.

The aqueous concentrate forms the liquid film of the bubbles when sprayed. The aqueous concentrate contains a surfactant. The surfactant within the aqueous concentrate is used to adjust the strength of the liquid film of the aqueous concentrate when foamed and control bubble separation, foamability and defoamability. The surfactant is also used as a solubilizing agent, emulsifier or fatliquoring agent, for ease in producing the aerosol composition and to improve the usability. Furthermore, the surfactant is used as the active ingredient of a treatment agent, a cleanser or a cleaner. The surfactant may be, for example, a nonionic surfactant, an anionic surfactant, a cationic surfactant, an amphoteric surfactant, a polymer surfactant, a silicone surfactant or a natural surfactant.

The nonionic surfactant may be, for example, sorbitan fatty acid ester, glycerin fatty acid ester, decaglycerin fatty acid ester, polyglycerin fatty acid ester, polyoxyethylene sorbitan fatty acid ester, polyoxyethylene sorbit fatty acid ester, polyoxyethylene glycerin fatty acid ester, polyethylene glycol fatty acid ester, polyoxyethylene alkyl ether, polyoxyethylene polyoxypropylene alkyl ether, polyoxyethylene alkyl phenyl ether or a derivative of polyoxyethylene castor oil or hydrogenated castor oil.

The anionic surfactant may be, for example, alkyl sulfate, polyoxyethylene alkyl ether sulfate, alkyl phosphate, polyoxyethylene alkyl ether phosphate or fatty acid soap.

The cationic surfactant may be, for example, an alkyl ammonium salt or an alkyl benzyl ammonium salt.

The amphoteric surfactant may be, for example, betaine acetate or lecithin.

The polymer surfactant may be, for example, polyalkyl vinyl pyridinium, alkylphenol polymer derivative or styrene-maleic acid polymer derivative.

The silicone surfactant may be, for example, a polyoxyethylene-methylpolysiloxane copolymer, a polyoxypropylene-methylpolysiloxane copolymer or a poly(oxyethylene-oxypropylene)-methylpolysiloxane copolymer.

The natural surfactant may be, for example, sodium surfactin, cyclodextrin or hydrogenated enzyme soybean lecithin.

These surfactants can be added in an amount of 0.1 to 30% by weight, preferably 0.5 to 20% by weight into the concentrate. When the amount is less than 0.1% by weight, foamability is inferior and obtaining bubbles in the form of soap bubbles tends to be difficult. On the other hand, when the amount is more than 30% by weight, usability becomes poor in that stickiness and irritation to skin are increased.

In the present invention, alcohol such as lower alcohol or polyol may be included in the aqueous concentrate.

The lower alcohol within the concentrate is used as a solubilizer for the active ingredient or with the purpose of increasing usability, for example, imparting cooling or improving dryness. Also, the lower alcohol is used with the purpose of adjusting bubble separation and foamability so that a large number of bubbles in the form of soap bubbles are formed when sprayed. In the present invention, the lower alcohol preferably has 2 to 5, more preferably 2 to 3 carbon atoms. Examples of lower alcohol are ethanol and isopropyl alcohol.

The lower alcohol is added to the aqueous concentrate in an amount of at least 1.0% by weight, preferably at least 3.0% by weight, and at most 60% by weight, preferably at most 50% by weight. When the content of lower alcohol is less than 1.0% by weight, the effects of adding a lower alcohol become difficult to obtain and the bubbles have difficulty separating, forming successive foam. On the other hand, when the content is more than 60% by weight, forming an emulsion with liquefied gas becomes difficult. As a result, foaming becomes difficult and mist is sprayed.

The polyol is used as a solubilizer for the active ingredient or a moisturizing agent and examples are glycerin, diglycerin, ethyleneglycol, propyleneglycol, 1,3-butyleneglycol, diethyleneglycol, dipropyleneglycol, polyethyleneglycol or polypropyleneglycol.

When adding the polyol, the amount is preferably 0.1 to 30% by weight, more preferably 0.5 to 25% by weight in the aqueous concentrate. When the content of polyol is less than 0.1% by weight, the effects of the polyol become difficult to obtain. When the content is more than 30% by weight, the foamability becomes poor and obtaining independent bubbles in the form of soap bubbles tends to become difficult.

The concentrate may further contain an active ingredient and other components if necessary.

The active ingredient included in the concentrate may be, for example, deodorant, disinfectant-antiseptic agent, refrigerant, insect repellent, hair setting agent, hair growth agent, moisturizing agent, ultraviolet light absorber, amino acid, vitamins, hormones, anti-oxidant, various extracts, antipruritic, anti-inflammatory analgesic, astringent, anti-inflammatory agent, local anesthetic, antihistamine, whitening agent, insecticide, effectiveness intensifier or perfume.

The deodorant may be, for example, lauric acid methacrylate, methyl benzoate, methyl phenyl acetate, geranyl crotonate, acetophenone myristate, benzyl acetate, benzyl propionate or zinc ricinoleate soap.

The disinfectant-antiseptic agent may be, for example, paraoxyhydroxybenzoate ester, sodium benzoate, potassium sorbate, phenoxy ethanol, benzalkonium chloride, benzetonium chloride, chlorohexyzine chloride, isopropyl methyl phenol, photosensitive material or parachlorometacresol.

The refrigerant may be, for example, 1-menthol or camphor.

The insect repellent may be, for example, N,N-diethyl-m-toluamide (Deet) or diethylamide caprylate.

The hair setting agent may be, for example, polyurethane, methylvinylimidazolium chloride-vinyl pyrrolidone copolymer liquid, dialkylaminoethyl(meth)acrylate-alkyl (meth) acrylate copolymer, octyl amide acrylate-hydroxypropyl acrylate-butylaminoethyl methacrylate copolymer, vinyl pyrrolidone-vinyl acetate copolymer, hydroxyethyl acrylate-butyl acrylate-methoxyethyl acrylate copolymer, alkanolamine acrylate-alkyl acrylate copolymer emulsion or alkyl acrylate-styrene copolymer emulsion.

The hair growth agent may be, for example, swertia herb extract, tincture of red pepper, pantothenic acid, salicylic acid or carpronium chloride.

The moisturizing agent may be, for example, urea, propylene glycol, glycerin, 1,3-butylene glycol, collagen, xylitol, sorbitol, hyaluronic acid, caronic acid, sodium lactate, d,1-pyrrolidone carboxylic acid salt, keratin, casein or lecithin.

The ultraviolet light absorber may be, for example, paraaminobenzoic acid, monoglycerin paraaminobenzoate, octyl salicylate, phenyl salicylate, isopropyl paramethoxy cinnamate or octyl paramethoxy cinnamate.

The amino acid may be, for example, glycine, alanine, leucine, serine, tryptophan, cystine, cysteine, methionine, aspartic acid, glutamic acid or arginine.

The vitamin may be, for example, retinol, retinol palmitate, pyridoxine hydrochloride, benzyl nicotinate, nicotinic acid amide, d,1-α-tocopherol nicotinate, vitamin D2 (ergocalciferol), d,1-α-tocopherol, d,1-α-tocopherol acetate, pantothenic acid or biotin.

The hormone may be, for example, elastradiol, or ethynyl elastradiol.

The anti-oxidant may be, for example, ascorbic acid, α-tocopherol, dibutyl hydroxytoluene or butyl hydroxyanisole.

The various extracts may be, for example, peony extract, loofah extract, rose extract, lemon extract, aloe extract, iris root extract, eucalyptus extract, sage extract, tea extract, seaweed extract, placenta extract or silk extract.

The antipruritic may be, for example, crotamiton, or d-camphor.

The anti-inflammatory analgesic may be, for example, methyl salicylate, camphor, indomethacin, piroxicam, fervinuc, or ketoprofen.

The astringent may be, for example, zinc oxide, allantoin hydroxyaluminium, tannic acid, citric acid or lactic acid.

The anti-inflammatory agent may be, for example, allantoin, glycyrrhetinic acid, dipotassium glycyrrhetinnate, ufenamate or azulene.

The local anesthetic agent may be, for example, dibucaine hydrochloride, tetracaine hydrochloride or lidocaine hydrochloride.

The antihistamine may be, for example, diphenhydrarnine, diphenhydramine hydrochloride or chlorphenylamine maleate.

The whitening agent may be, for example, arbutin, or kojic acid.

The insecticide may be, for example, permethrin, phthalthrin, imiprotorin, allethrin, resmetorin, d-phenotorin, propalthrin, neopinaminforte or chrisronforte.

The effectiveness intensifier may be, for example, cinepilin, piperonyl butoxide or octachlorodipropylether.

The active ingredient may be added to the aqueous concentrate in an amount of 0.05 to 20% by weight, preferably 0.1 to 15% by weight. When the amount of the active ingredient is less than 0.05% by weight, the effects of the active ingredient are not sufficiently exhibited. On the other hand, when the amount is more than 20% by weight, the concentration of the active ingredient is too high and depending on the active ingredient, the human body may be adversely affected in some cases. When the active ingredient is excellent in solubility to an oil component, the active ingredient may be dissolved into an oil component and then added.

The other components included in the aqueous concentrate may be, for example, an oil component, a pH adjuster, a polymer compound, or powder. The content of these components can suitably be set by one skilled in the art.

The oil component is a component for improving usability and imparting effects such as water repellency. Examples are silicone oil, hydrocarbon, ester oil, higher fatty acid, higher alcohol, wax and fat.

The silicone oil may be, for example, methyl polysiloxane, high polymerized methyl polysiloxane, octamethyl trisiloxane, decamethyl tetrasiloxane, octamethyl cyclotetrasiloxane, decamethyl cyclopentasiloxane, dimethyl silicone emulsion or methyl phenyl polysiloxane.

The hydrocarbon may be, for example, n-pentane, isopentane, n-hexane, isohexane, liquid paraffin, isoparaffin, kerosene, suquarane or squalene. Furthermore, hydrocarbon having 5 to 6 carbon atoms such as n-pentane, isopentane, n-hexane, or isohexane may be mixed with liquefied gas, which is used as the spraying agent, in order to adjust foamability.

The ester oil may be, for example, isopropyl myristate, cetyl octanoate, octyl dodecyl myristate, isopropyl palmitate, cetyl lactate, ethyl acetate, diethyl phthalate, diethoxyethyl phthalate or diethoxyethyl succinate.

The higher fatty acid may be, for example, lauric acid, myristic acid, palmitic acid, stearic acid or oleic acid.

The higher alcohol may be, for example, lauryl alcohol, cetyl alcohol, stearyl alcohol, behenyl alcohol, myristyl alcohol, oleyl alcohol and lanolin alcohol.

The wax may be, for example, beeswax, lanolin, lanolin acetate, candelila wax, paraffin wax and microcrystallin wax.

The fat may be, for example, camellia oil, corn oil, olive oil, rapeseed oil, sesame oil, castor oil, lineseed oil, safflower, jojoba oil or coconut oil.

The pH adjuster is used for stabilizing the aqueous concentrate and aerosol composition over a long period and decreases corrosion of the pressure resistant container and prevents the active ingredient from being decomposed over time.

The pH adjuster may be, for example, lactic acid, citric acid, sodium citrate, glycolic acid, succinic acid, tartaric acid, potassium carbonate, sodium hydrogen carbonate or ammonium hydrogen carbonate.

The polymer compound is used with the purpose of adjusting viscosity of the aqueous concentrate and properties of the bubbles, such as elasticity of the bubbles, defoamability and dryness.

The polymer compound may be, for example, carrageenan, pectin, starch, gelatin, collagen, carboxymethyl starch, ethyl cellulose, hydroxyethyl cellulose, hydroxypropyl cellulose, crystal cellulose, carboxyvinyl polymer or xanthan gum.

The powder functions as the active ingredient itself or is used as a carrier which carries the other active ingredients, protective agent, adhesive or solid lubricant. Examples are talc, zinc oxide, kaoline, mica, magnesium carbonate, calcium carbonate, zinc silicate, magnesium silicate, aluminum silicate, calcium silicate, silica, zeolite, ceramic powder and boron nitride.

The aqueous concentrate used in the present invention is prepared by dissolving or dispersing the above surfactant, active ingredient and other ingredients into water or an aqueous alcohol solution.

The liquefied gas used in the aerosol product of the present invention forms the aerosol composition by emulsifying with the aqueous concentrate and is the component which forms bubbles in the shape of soap bubbles, by foaming the aqueous concentrate when the aerosol composition is sprayed.

The liquefied gas charged into an aerosol product of the present invention may be, for example, propane, n-butane, i-butane or a liquefied petroleum gas, which is a mixture thereof, or dimethyl ether, chlorofluorocarbons or a mixture thereof. Particularly, a liquefied gas having liquefied petroleum gas as the main component is preferable from the viewpoint that an emulsion with the aqueous concentrate can be prepared with ease. The content of the liquefied petroleum gas in the liquefied gas is preferably at least 40% by weight, particularly at least 50% by weight. A compressed gas may be added as a pressurizing agent and examples are nitrogen, carbon dioxide, dinitrogen monoxide and compressed air. Because dimethyl ether is an amphipathic component, when dimethyl ether is added to liquefied gas and the content of dimethyl ether becomes large, the aerosol composition has difficulty becoming an emulsion and is sprayed as mist and does not become bubbles. Therefore, the content of dimethyl ether is preferably at most 60% by weight, more preferably at most 50% by weight in the liquefied gas. The vapor pressure (at 20° C.) of the liquefied gas is 0.2 to 0.5 MPa, preferably 0.25 to 0.5 MPa. When the vapor pressure is less than 0.2 MPa, foaming does not occur and bubbles in the form of soap bubbles are not formed. When the vapor pressure is more than 0.5 MPa, the particles become too fine and foaming becomes difficult.

The aerosol composition charged in the aerosol product of the present invention desirably has a ratio of the aqueous concentrate and the liquefied gas (aqueous concentrate/ liquefied gas (weight ratio)) of 50/50 to 5/95, preferably 45/55 to 10/90. When the content of the liquefied gas is less than 50% by weight, the sprayed aerosol composition tends to fall without foaming in space and obtaining the desired effect tend to become difficult. On the other hand, when the content of the liquefied gas is more than 95% by weight, forming bubbles in the form of soap bubbles becomes difficult. The aerosol composition is prepared by mixing the above-mentioned aqueous concentrate and liquefied gas in the above compounding ratio and then emulsifying.

Figure 3:
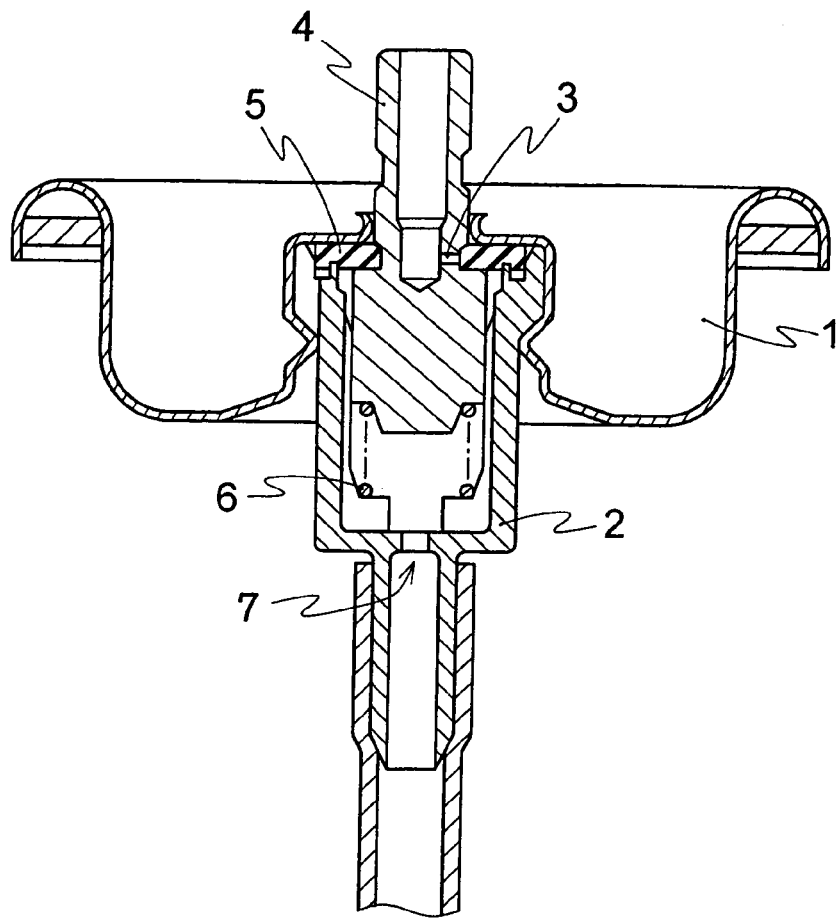
FIG. 3 is a schematic cross-sectional view depicting the structure of the aerosol valve part of the aerosol container used in Examples.

In general, an aerosol container has a container body, an aerosol valve and a spray button. In the present invention, the container body is not particularly limited and a container having pressure resistance may be used, for example a container of metal such as aluminum or tin, a container of resin such as polyethylene terephthalate (PET) or polybutylene terephthalate (PBT) and a glass container. As the aerosol valve, an aerosol valve without a vapor tap is preferably used and consequently independent bubbles in the form of soap bubbles can be sprayed. FIG. 3 depicts a cross-sectional drawing of one embodiment of an aerosol valve without a vapor tap.

As an aerosol valve, a valve comprising mounting cup 1, which is attached to the opening of the container body, and a spray valve, which is supported by the inner center of mounting cup 1, can be used. The spray valve has a cylindrical housing 2 having a bottom, in which the periphery of the opening is supported by the inner center of mounting cup 1. Housing 2 has stem 4 having stem orifice 3, which connects the inside and outside of the aerosol container, stem rubber 5 which is attached around stem orifice 3 and spring 6 which pushes stem 4 and stem rubber 5 upward. In normal conditions, stem 4 and stem rubber 5 are pushed upward by spring 6 and stem orifice 3 is sealed by stem rubber 5.

There are aerosol valves equipped with housing 2 having introducing orifice 7, by which the aerosol composition within the container body is introduced into housing 2, and those having a vapor tap orifice in addition to the introducing orifice 7. The vapor tap orifice is an orifice for introducing the gas part of the liquefied gas in the gas phase within the container body into housing 2 and has the effects of reducing the amount of the aerosol composition introduced into housing 2 and shortening the flame length, even when the composition contains a large amount of combustible components. However, because a large amount of gas is present in the aerosol composition between stem orifice 3 and the nozzle of the spray button, in the case that the aerosol composition of the present invention is sprayed by an aerosol valve with a vapor tap orifice, independent bubbles in the form soap bubbles are difficult to form.

In a preferable embodiment of the aerosol valve, the stem orifice is 0.2 to 0.6 mm, preferably 0.2 to 0.5 mm and the introducing orifice of the housing is 0.2 to 2.0 mm, preferably 0.3 to 1.5 mm. When the stem orifice and/or introducing orifice of the housing is smaller than the above range, clogging by aerosol composition tends to occur. When the stem orifice and/or introducing orifice of the housing is larger than the above. range, the spraying amount becomes too large and independent bubbles in the form soap bubbles are difficult to form.

Figure 4:
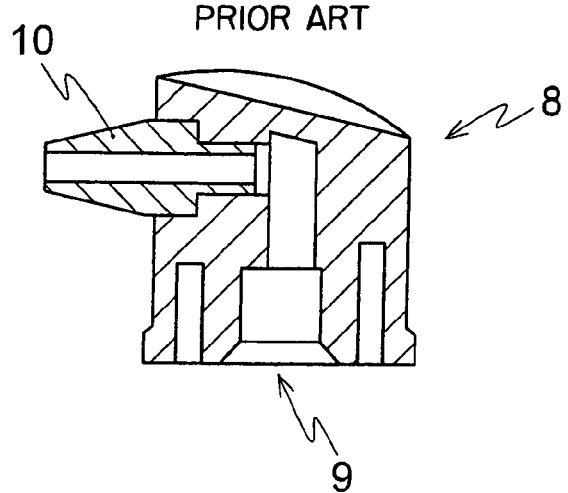
FIG. 4 is a schematic cross-sectional view depicting the structure of the spraying button of the aerosol container used in Examples.
Figure 5:
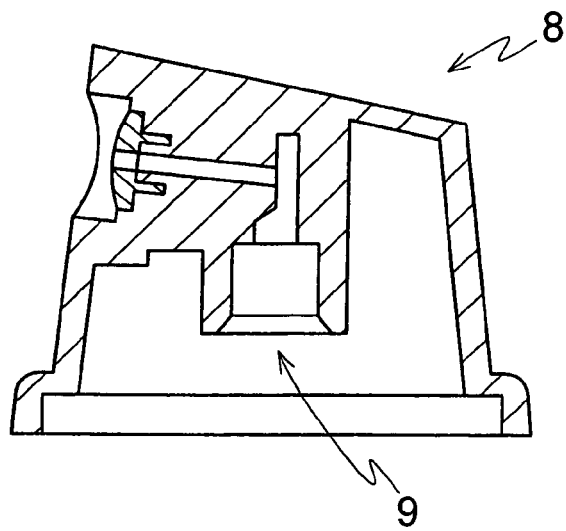
FIG. 5 is a schematic cross-sectional view depicting the structure of an embodiment of a spraying button used in the present invention.
Figure 6:
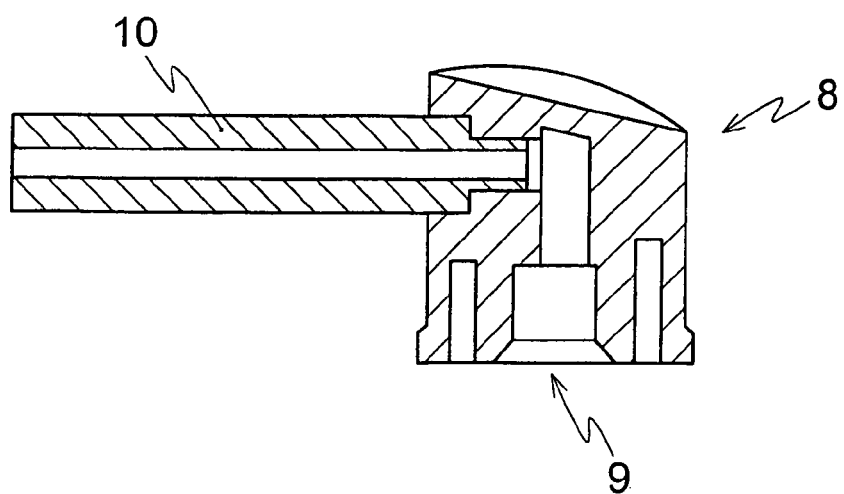
FIG. 6 is a schematic cross-sectional view depicting the structure of an embodiment of a spraying button used in the present invention.

FIG. 4 shows a sectional view of one embodiment of a spray button. The spray button comprises button body 8, stem inserting orifice 9 for attaching button body 8 to the stem of the aerosol valve and nozzle 10 which has a spraying orifice and is attached to button body 8. The spraying orifice may also be formed on the button body. Examples of other spray buttons are shown in FIGS. 5 and 6. The spray button of the aerosol product of the present invention preferably has a straight spray orifice in order to spray the aerosol composition as though pushed out and to easily form independent bubbles in the form of soap bubbles. In the case of a spray button having mechanical break up mechanism, the sprayed aerosol composition forms a vortex flow, making the sprayed particles too small for foaming, and destroys the bubbles and spraying as independent bubbles in the form of soap bubbles becomes difficult. Also, after draw is increased and the aerosol composition drips and adheres to the aerosol product, dirtying the product. The diameter of the spraying orifice is preferably 0.2 to 2.5 mm, more preferably 0.3 to 2.0 mm.

The aerosol product of the present invention is obtained by preparing the aerosol composition by charging the container body with the aqueous concentrate and liquefied gas, attaching the aerosol valve and emulsifying the aqueous concentrate and liquefied gas by a method such as shaking the container body, and then attaching the spray button to the stem of the aerosol valve. The aerosol composition can also be added in the container body equipped with an aerosol valve, after emulsifying the aqueous concentrate and liquefied gas in advance using an emulsifying device.

The spraying amount of the aerosol product of the present invention is preferably at most 3.0 g/5 sec, more preferably at most 2.0 g/5 sec. When the spraying amount is large, mist is formed and independent bubbles in the form of soap bubbles cannot be sprayed. The spraying amount of the aerosol product can be adjusted by specifications such as the stem orifice of the aerosol valve, the introducing orifice of the housing and the spraying orifice and length of the spraying button, and formulations such as the compounding ratio of the aqueous concentrate and the liquefied gas and the vapor pressure of the liquefied gas.

The aerosol product obtained by the above method can be suitably used for products for a hair such as styling agent, treatment agent and hair growth agent and products for the human body such as anti-inflammatory analgesic, antipruritic, anti-perspirant, vulnerary, sunburn soother and deodorant, as a large number of independent bubbles in the form of soap bubbles can be sprayed and the bubbles are superior in adhesion to hair and skin. Also, the aerosol product can be used for household goods such as indoor deodorant, aromatic agent, insecticide, glass cleaner and cleaner, as dispersabilily of the active ingredient is superior.

Hereinafter, the present invention is described by means of Examples, but the present invention is not limited thereto

EXAMPLES 1 to 8

An aqueous concentrate (hereinafter referred to as aqueous concentrate A) was prepared in the following composition.

| 1,3-Butylene glycol | 1.0 |
|---|---|
| Methylpolysiloxane (6cs) (*1) | 2.0 |
| POE (10) oleylether (*2) | 1.0 |
| Stearyl trimethylammonium chloride (*3) | 0.5 |
| 99% Ethanol | 40.0 |
| Purified water | 55.5 |
| Total | 100.0 (% by weight) |

(*1) SH200 (6cs) (product name), available from Dow Corning Toray Silicone Co., Ltd.
(*2) BO-10 (product name), available from Nikko Chemicals Co., Ltd.
(*3) COATAMIN 86 PC (product name), available from Kao Corporation Then, an pressure-resistant aluminum container (100 ml capacity) was charged with, as the aerosol composition, the above aqueous concentrate and a liquefied petroleum gas (with a vapor pressure at 20° C. as shown in Table 1) as the liquefied gas, in the ratio (aqueous concentrate/liquefied gas (weight ratio)) shown in Table 1. Next, the aqueous concentrate and the liquefied gas were emulsified to prepare the aerosol composition. As the aerosol valve, one equipped with the valve shown in FIG. 3, having a stem orifice of a diameter of 0.3 mm and an introducing orifice of a diameter of 0.3 mm and is without a vapor tap orifice, and the button shown in FIG. 4, with a straight spraying orifice of a diameter of 1.6 mm, was used.

Then, after leaving in a constant water bath of 25° C. for 30 minutes, the obtained aerosol product was sprayed and the state of the sprayed composition was videotaped and evaluated. The results are shown in Table 1. With respect to the aerosol product of Example 5, when the particle size of bubbles in the form of soap bubbles were measured at the point 15 cm from the spraying orifice, the result showed that most were within the range of 0.5 to 1.5 mm and the average value was 0.86 mm.

Comparative Examples 1 and 2

Aqueous concentrate A was used as the aqueous concentrate and liquefied petroleum gas (vapor pressure at 20° C. of 0.34 MPa) was used as the liquefied gas. The aqueous concentrate/liquefied gas was emulsified in a ratio (weight ratio) of 60/40 (Comparative Example 1) and 3/97 (Comparative Example 2) to prepare the aerosol product. The aerosol products were evaluated in the same manner as in Examples 1 to 8. The results are shown in Table 1.

Comparative Example 3

Aqueous concentrate A was used as the aqueous concentrate and dimethyl ether was used as the liquefied gas. An aerosol product in which the aqueous concentrate/liquefied gas was dissolved in a ratio (weight ratio) of 40/60 was prepared. The aerosol product was evaluated in the same manner as in Examples 1 to 8. The results are shown in Table 1.

Comparative Example 4

In the composition of aqueous concentrate A, an alcoholic solution containing 95.5% of ethanol instead of purified water and liquefied petroleum gas (vapor pressure at 20° C. of 0.34 MPa) were used. An aerosol product in which the alcoholic solution/liquefied gas was dissolved in a ratio (weight ratio) of 30/70 was prepared. The aerosol product evaluated in the same manner as in Examples 1 to 8. The results are shown in Table 1.

TABLE 1

| | Aqueous Concentrate/ Liquified Gas (weight ratio) | Vapor Pressure at 20° C. of Liquified Gas (MPa) | Evaluation |
|---|---|---|---|
| Ex. 1 | 50/50 | 0.44 | ◯ |
| Ex. 2 | 40/60 | 0.29 | ◯ |
| Ex. 3 | 30/70 | 0.20 | ◯ |
| Ex. 4 | 30/70 | 0.44 | ◯ |
| Ex. 5 | 25/75 | 0.34 | ◯ |
| Ex. 6 | 20/80 | 0.25 | ◯ |
| Ex. 7 | 20/80 | 0.49 | ◯ |
| Ex. 8 | 10/90 | 0.34 | ◯ |
| Com. Ex. 1 | 60/40 | 0.34 | X1 |
| Com. Ex. 2 | 3/97 | 0.34 | X2 |
| Com. Ex. 3 | 40/60 | 0.43 | X3 |
| Com. Ex. 4 | 30/70 | 0.34 | X3 |

Evaluation Criteria
◯: A large number of bubbles in the form of soap bubbles are obtained.
X1: Foaming does not occur until dropped and sprayed as liquid.
X2: Particles are too small to confirm foaming.
X3: Foaming does not occur.

EXAMPLES 9 to 12

An aqueous concentrate (hereinafter referred to as aqueous concentrate B) was prepared in the following composition.

| Concentrated glycerin | 18.0 |
|---|---|
| Methyl polysiloxane (*1) | 18.0 |
| Polyoxyethylene (40) cetyl ether (*4) | 3.0 |
| Stearyl trimethylammonium chloride | 12.0 |
| 99% Ethanol | 17.0 |
| Purified water | 32.0 |
| Total | 100.0 (% by weight) |

(*4) BC-40TX (product name), available from Nikko Chemicals Co., Ltd.

EXAMPLE 9

A pressure-resistant aluminum container (220 ml capacity) was charged with 30 g of aqueous concentrate B and 70 g of liquefied petroleum gas (vapor pressure of 0.39 MPa at 20° C.) as the liquefied gas and an aerosol valve was attached thereto.

The aerosol composition was prepared within the container by shaking the container to emulsify the aqueous concentrate and the liquefied petroleum gas. Then, a spraying button was attached to prepare an aerosol product.

As the aerosol valve, the valve shown in FIG. 3 (stem orifice of 0.5 mm, housing introducing orifice of 0.5 mm, no vapor tap) was used and as the spraying button, the button shown in FIG. 4 (spraying orifice diameter of 1.6 mm) was used. The obtained aerosol product was evaluated in the same manner as in Examples 1 to 8. The results are shown in Table 2.

As in Example 5, the state of the sprayed composition was videotaped and when the particle size of bubbles in the form of soap bubbles were measured at a point 15 cm from the spraying orifice, most were within the range of 1.0 to 2.5 mm and the average value was 1.7 mm.

EXAMPLE 10

An aerosol product identical to that of Example 9, except that the button shown in FIG. 5 (spraying orifice diameter of 0.9 mm) was used as the spraying button, was evaluated in the same manner as in Examples 1 to 8. The results are shown in Table 2.

EXAMPLE 11

An aerosol product identical to that of Example 9, except that the button shown in FIG. 6 (spraying orifice diameter of 1.5 mm, tube length of 30 mm) was used as the spraying button, was evaluated in the same manner as in Examples 1 to 8. The results are shown in Table 2.

EXAMPLE 12

An aerosol product was prepared using 40 g of the aqueous concentrate B and 60 g of a mixture of liquefied petroleum gas and dimethyl ether (liquefied petroleum gas/dimethyl ether: 80/20 in weight ratio, vapor pressure at 20° C.: 0.39 MPa) as the liquefied gas.

An aerosol valve and spraying button identical to those of Example 9 were used and the obtained aerosol product was evaluated in the same manner as in Examples 1 to 8. The results are shown in Table 2.

TABLE 2

| | Aqueous Concentrate/ Liquified Gas (weight ratio) | Vapor Pressure of Liquified Gas (MPa) | Spraying Button | Evaluation |
|---|---|---|---|---|
| Ex. 9 | 30/70 | 0.39 | FIG. 4 | ○ |
| Ex. 10 | 30/70 | 0.39 | FIG. 5 | ○ |
| Ex. 11 | 30/70 | 0.39 | FIG. 6 | ○ |
| Ex. 12 | 40/60 | 0.35 | FIG. 4 | ○ |

Product Example 1

Deodorant-Aromatic Agent

| <Composition of aqueous concentrate> | |
|---|---|
| Zinc ricinolate soap (*5) | 1.00 |
| Isopropylmethylphenol (*6) | 0.10 |
| Polyoxyethylene (40) cetyl ether (*4) | 1.00 |
| Stearyl trimethylammonium chloride (*3) | 3.00 |
| Perfume (*7) | 0.01 |
| 99% Ethanol | 30.00 |
| Purified water | 64.89 |
| Total | 100.00 (% by weight) |

(*5) Grillocin 15 N (product name), available Haarmann & Reimer K. K.
(*6) Isopropylmethylphenol (product name), available from Osaka Kasei Co., Ltd.
(*7) HERB ESSENCE N16 644 (product name), available from Haarmann & Reimer K. K.

Production of Aerosol Product

A pressure-resistant aluminum container (220 ml capacity) was charged with 25 g of aqueous concentrate B and 75 g of liquefied petroleum gas (vapor pressure of 0.35 MPa at 20° C.) as the liquefied gas and an aerosol valve was attached thereto. The aerosol composition was prepared within the container by shaking the container to emulsify the aqueous concentrate and the liquefied petroleum gas. Then, a spraying button was attached to prepare an aerosol product. As the aerosol valve, the valve shown in FIG. 3 (stem orifice of 0.3 mm, housing introducing orifice of 0.3 mm, no vapor tap) was used and as the spraying button, the button shown in FIG. 4 having a spraying orifice diameter of 1.5 mm was used.

Product Example 2

Insecticide for Gardening

| <Composition of aqueous concentrate> | |
|---|---|
| Permethrin (*8) | 1.0 |
| Polyoxyethylene (40) cetyl ether | 0.5 |
| Stearyl trimethylammonium chloride | 2.0 |
| 99% ethanol | 30.0 |
| Purified water | 66.5 |
| Total | 100.00 (% by weight) |

(*8) ECTHMIN (product name), available from Sumitomo Chemical Co., Ltd.

Production of Aerosol Product

A pressure-resistant aluminum container (220 ml capacity) was charged with 30 g of the above aqueous concentrate and 70 g of a liquefied petroleum gas (vapor pressure at 20° C. of 0.44 MPa) as the liquefied gas and an aerosol valve was attached thereto. The aerosol composition was prepared within the container by shaking the container to emulsify the aqueous concentrate and the liquefied petroleum gas. Then, a spraying button was attached to prepare an aerosol product. As the aerosol valve, the valve shown in FIG. 3 (stem orifice of 0.5 mm, housing introducing orifice of 1.5 mm, no vapor tap) was used and as the spraying button, the button shown in FIG. 4 having a spraying orifice diameter of 1.6 mm was used.

Product Example 3

Treatment Agent

| <Composition of aqueous concentrate> | |
|---|---|
| 1,3-Butylene glycol | 2.0 |
| High polymerized methylpolysiloxane (*9) | 2.0 |
| Methylpolysiloxane (*1) | 2.0 |
| Polyoxyethylene (40) cetyl ether | 1.5 |
| Stearyl trimethylammonium chloride | 5.0 |
| 99% Ethanol | 30.0 |
| Purified water | 57.5 |
| Total | 100.0 (% by weight) |

(*9) BY11-014 (product name), available from Dow Corning Toray Silicone Co., Ltd.

Production of Aerosol Product

A pressure-resistant aluminum container (220 ml capacity) was charged with 40 g of the above aqueous concentrate and 60 g of a mixture of liquefied petroleum gas and dimethyl ether (liquefied petroleum gas/dimethyl ether: 80/20 in weight ratio, vapor pressure at 20° C.: 0.39 MPa) as the liquefied gas and an aerosol valve was attached thereto. The aerosol composition was prepared within the container by shaking the container to emulsify the aqueous concentrate and the liquefied petroleum gas. Then, a spraying button was attached to prepare an aerosol product. As the aerosol valve, the valve shown in FIG. 3 (stem orifice of 0.4 mm, housing introducing orifice of 1.0 mm, no vapor tap) was used and as the spraying button, the button shown in FIG. 6 having a spraying orifice diameter of 1.5 mm and a length of 30 mm was used.

Product Example 4

Styling Agent

| <Composition of aqueous concentrate> | |
|---|---|
| Methyl vinyl imidazolium chloride-vinylpyrrolidone copolymer solution (*10) | 10.0 |
| Polyoxyethylene-methylpolysiloxane copolymer (*11) | 2.0 |
| Methyl phenyl polysiloxane (*12) | 6.0 |
| Polyoxyethylene (40) cetyl ether | 1.0 |
| Stearyl trimethyl ammonium chloride | 6.0 |
| 99% ethanol | 35.0 |
| Purified water | 40.0 |
| Total | 100.0 |
| | (% by weight) |

(*10) Luviquat HM552 (product name), available from BASF AG
(*11) SH3775M (product name), Dow Corning Toray Silicone Co., Ltd.
(*12) SH556 (product name), Dow Corning Toray Silicone Co., Ltd.

Production of Aerosol Product

A pressure-resistant aluminum container (220 ml capacity) was charged with 30 g of the above aqueous concentrate and 70 g of a liquefied petroleum gas (vapor pressure at 20° C. of 0.39 MPa) as the liquefied gas and an aerosol valve was attached thereto. The aerosol composition was prepared within the container by shaking the container to emulsify the aqueous concentrate and the liquefied petroleum gas. Then, a spraying button was attached to prepare an aerosol product. As the aerosol valve, the valve shown in FIG. 3 (stem orifice of 0.3 mm, housing introducing orifice of 0.3 mm, no vapor tap) was used and as the spraying button, the button shown in FIG. 5 having a spraying orifice diameter of 0.9 mm was used.

Product Example 5

Cool Lotion

| <Composition of aqueous concentrate> | |
|---|---|
| 1-mentol | 0.5 |
| Glycerin | 2.0 |
| Jojoba oil (*13) | 2.0 |
| Polyoxyethylene (40) cetyl ether | 0.5 |
| Stearyl trimethyl ammonium chloride | 2.0 |
| 99% Ethanol | 40.0 |
| Purified water | 53.0 |
| Total | 100.0 (% by weight) |

(*13) Jojoba oil (product name), available from Koei Kogyo Co., Ltd.

Production of Aerosol Product

A pressure-resistant aluminum container (220 ml capacity) was charged with 30 g of the above aqueous concentrate and 70 g of a liquefied petroleum gas (vapor pressure at 20° C. of 0.39 MPa) as the liquefied gas and an aerosol valve was attached thereto. The aerosol composition was prepared within the container by shaking the container to emulsify the aqueous concentrate and the liquefied petroleum gas. Then, a spraying button was attached to prepare an aerosol product. As the aerosol valve, the valve shown in FIG. 3 (stem orifice of 0.5 mm, housing introducing orifice of 1.0 mm, no vapor tap) was used and as the spraying button, the button shown in FIG. 4 having a spraying orifice diameter of 1.6 mm was used.

INDUSTRIAL APPLICABILITY

According to the present invention, an aerosol product, which sprays a large number of independent bubbles in the form of soap bubbles, is provided. By the aerosol product of the present invention, the aerosol composition can be sprayed in a state in which adhesion to the object is superior, in comparison to common spray. Also, the bubbles sprayed from the aerosol product of the present invention break more easily than the common bubbles and therefore can be broken in space. Furthermore, in the aerosol product of the present invention, the active ingredient included in the liquid film part diffuses when the bubble is broken and therefore, the aerosol product can be used for products for space. Also, the bubbles sprayed therefrom can be used by spreading on the coating surface, in the same manner as common foam.

The invention claimed is:

1. An aerosol product comprising an aerosol container charged with an aerosol composition obtained by emulsifying an aqueous concentrate and a liquefied gas;
   wherein said aqueous concentrate contains 0.1 to 30% by weight of a surfactant, and said liquefied gas comprises a liquefied petroleum gas as a main component and has a vapor pressure at 20° C. of 0.2 to 0.5 MPa,
   wherein the ratio of said aqueous concentrate and said liquefied gas (aqueous concentrate/liquefied qas (weight ratio)) is 5/95 to 50/50, and
   wherein said aerosol product sprays a large number of independent bubbles in a form of soap bubbles.

2. The aerosol product of claim 1, wherein said aqueous concentrate contains 3.0 to 60% by weight of a lower alcohol.

3. The aerosol product of claim 1, wherein said aerosol container has an aerosol valve without a vapor tap.

4. The aerosol product of claim 1, wherein a spraying button which is fixed to said aerosol container has a straight spraying orifice and has no mechanical break up mechanism.

5. The aerosol product of claim 1, wherein a spraying button which is fixed to said aerosol container has a spraying orifice having a diameter of 0.2 to 2.5 mm.

6. The aerosol product of claim 1, wherein the spraying amount is at most 3.0 g/5 sec.

7. The aerosol product of claim 1, wherein the diameter of said independent bubbles in a form of soap bubbles is 0.1 to 10 mm.

* * * * *